UNITED STATES PATENT OFFICE.

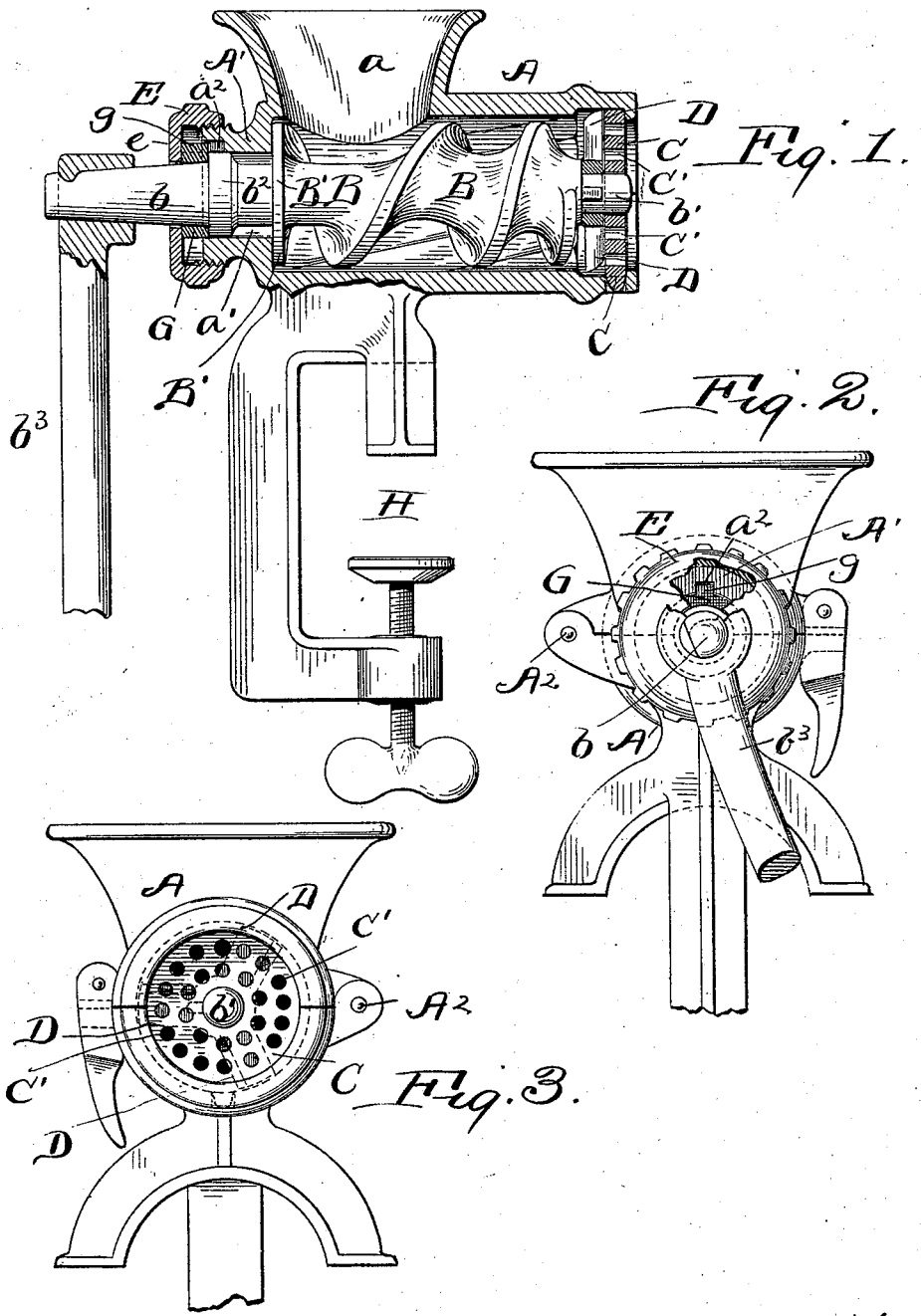

WILLIAM KOENEN, OF CLEVELAND, OHIO, ASSIGNOR TO HENRY C. RICE, CHARLES F. LAY, AND N. C. SHERWOOD, OF FREMONT, OHIO.

MEAT-CUTTER.

SPECIFICATION forming part of Letters Patent No. 575,895, dated January 26, 1897.

Application filed May 7, 1895. Serial No. 548,421. (No model.)

*To all whom it may concern:*

Be it known that I, WILLIAM KOENEN, of Cleveland, in the county of Cuyahoga and State of Ohio, have invented certain new and useful Improvements in Meat-Cutters; and I do hereby declare the following to be a full, clear, and exact description of the invention, such as will enable others skilled in the art to which it pertains to make and use the same.

My invention relates to improvements in meat-cutters, the object being to devise more desirable means than heretofore employed for moving the conveying worm or screw, with which the knives or cutters are operatively connected, endwise as required to properly adjust the knives or cutters relative to the perforated disk or head at the discharging end of the case or shell, wherein the conveying worm or screw operates.

With this object in view my invention consists in certain features of construction and combinations of parts hereinafter described, and pointed out in the claim.

In the accompanying drawings, Figure 1 is a side elevation, partly in central longitudinal section, of a meat-cutter embodying my invention. Figs. 2 and 3 are elevations of opposite ends, respectively, of the machine, portions being broken away in said figures to reduce their size and to more clearly show the construction.

Referring to the drawings, A designates a case or sheel within which a conveying worm or screw B is arranged longitudinally in such a manner as to receive the meat from mouth $a$ at the receiving end of case or shell A and convey the same toward the discharging end of said shell or case. Case or shell A at its discharging end is provided with a disk or head C, that is supported in any suitable manner, and is provided with any suitable number of lateral openings C' to accommodate the discharge of the meat. The meat is cut at the inner face of head or disk C by means of knives or cutters D, that are operatively connected with the conveying worm or screw, and arranged in any approved manner to render them capable of performing their function.

A' designates the head at the receiving end of case or shell A, said head being preferably integral with the body portion of the case or shell. Worm or screw is provided with trunnions $b$ $b'$ at opposite ends, respectively, of the screw or worm, trunnion $b'$ having bearing in perforated disk or head C and trunnion $b$ extending through an opening $a'$, formed centrally of head A'. Trunnion $b$ is provided with an annular enlargement or collar $b^2$, that has bearing in the outer end of head A'. Head A' is circular and screw-threaded externally at its outer end, and said threaded end of the head is engaged by a correspondingly-threaded nut E. Nut E at its outer end is provided with an internal annular flange $e$, that loosely embraces trunnion $b$. A collar G is loosely mounted upon trunnion $b$ between the inner face of flange $e$ of nut E and the external or adjacent face of collar $b^2$ of said trunnion, and said collar, in order to avoid as much friction as possible between it and collar $b^2$ of trunnion $b$, is provided upon its periphery with a radially-projecting tongue $g$, that engages a recess $a^2$, formed in the surrounding wall of opening $a'$. Trunnion $b$ at its outer end is provided in any approved manner with a crank or lever $b^3$ for operating the conveying worm or screw and connected knives or cutters, and said screw or worm at the inner face of head A' is preferably provided with an annular flange B', adapted to engage said face or head A', and, in conjunction with head A', sustains the endwise thrust of the worm or screw in the operation of the machine.

By the construction hereinbefore described it will readily be observed that the knives or cutters are adjusted relative to the coöperating face of head C by manipulating nut E, and that by means of the construction involving the collar $b^2$ of trunnion $b$, nut E, and collar G, interposed between collar $b^2$ and internal flange of the aforesaid nut, a uniform adjustment of the knives or cutters upon the manipulation of the nut is obtained.

Case or shell A at the bottom is preferably provided with a suitable clamp H for attaching the machine to a table, bench, or counter.

I would also remark that shell or case A is preferably made in two sections hinged together, as at A², at one side of the machine and locked together by any well-known locking or fastening mechanism at the opposite side of the machine.

What I claim is—

A meat-cutter comprising a shell or case A provided between its ends with a mouth $a$ and provided with the perforated discharge-head C at one end, and terminating at the opposite end in the head A' that is centrally perforated at $a'$ and has its outer end externally screw-threaded, and is provided with a recess $a^2$ internally; the suitably-operated screw or worm B having trunnions $b$ and $b'$ and the annular enlargement or collar $b^2$; knives or cutters operatively connected with the screw or worm; a nut E mounted upon the threaded end of the aforesaid threaded head, and provided with the internal flange $e$; the collar G, loosely surrounding trunnion $b$ and interposed between said flange and the aforesaid annular enlargement or collar $b^2$, and provided, upon its periphery, with the tongue $g$ engaging the aforesaid recess, substantially as shown, for the purpose specified.

In testimony whereof I sign this specification, in the presence of two witnesses, this 23d day of January, 1895.

WILLIAM KOENEN.

Witnesses:
C. H. DORER,
L. WARD HOOVER.